US008831127B2

(12) United States Patent
Nilsson et al.

(10) Patent No.: US 8,831,127 B2
(45) Date of Patent: Sep. 9, 2014

(54) ANTENNA RECONFIGURATION FOR MIMO COMMUNICATIONS WHEN MULTIPLICATIVE NOISE LIMITED

(71) Applicants: Andreas Nilsson, Göteborg (SE); Henrik Asplund, Stockholm (SE); Mikael Coldrey, Landvetter (SE); Jonas Medbo, Uppsala (SE); Mathias Riback, Täby (SE); Karl Werner, Segeltorp (SE)

(72) Inventors: Andreas Nilsson, Göteborg (SE); Henrik Asplund, Stockholm (SE); Mikael Coldrey, Landvetter (SE); Jonas Medbo, Uppsala (SE); Mathias Riback, Täby (SE); Karl Werner, Segeltorp (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/714,613

(22) Filed: Dec. 14, 2012

(65) Prior Publication Data
US 2014/0169430 A1 Jun. 19, 2014

(51) Int. Cl.
*H04B 7/02* (2006.01)
*H04B 7/04* (2006.01)

(52) U.S. Cl.
CPC ........................................ *H04B 7/043* (2013.01)
USPC ........... 375/267; 375/295; 375/316; 375/296; 375/299; 375/304; 375/315; 375/314; 375/346; 375/347; 375/349; 375/259; 375/260; 375/285

(58) Field of Classification Search
USPC ......... 375/295, 316, 296, 299, 304, 315, 314, 375/346, 347, 349, 259, 260, 267, 285
See application file for complete search history.

(56) References Cited

U.S. PATENT DOCUMENTS

| | | | |
|---|---|---|---|
| 7,505,529 B2 | 3/2009 | Kwak et al. | |
| 7,729,232 B2 | 6/2010 | Wang et al. | |
| 8,094,744 B1 | 1/2012 | Song et al. | |
| 8,446,318 B2 * | 5/2013 | Ali et al. | 342/383 |
| 8,588,324 B2 | 11/2013 | Mondal et al. | |
| 2005/0088358 A1 * | 4/2005 | Larry et al. | 343/833 |
| 2007/0115180 A1 | 5/2007 | Kish et al. | |
| 2009/0086648 A1 | 4/2009 | Xu et al. | |
| 2009/0186658 A1 * | 7/2009 | Jiang et al. | 455/562.1 |
| 2010/0002801 A1 * | 1/2010 | Jia et al. | 375/296 |
| 2010/0291865 A1 * | 11/2010 | Gore et al. | 455/7 |
| 2011/0051834 A1 | 3/2011 | Lee et al. | |
| 2012/0120997 A1 | 5/2012 | Park et al. | |
| 2012/0157001 A1 | 6/2012 | Chiu et al. | |
| 2014/0029509 A1 | 1/2014 | Murakami et al. | |

OTHER PUBLICATIONS

Baum, D. et al., "Impact of Phase Noise on MIMO Channel Measurement Accuracy", IEEE 60th Vehicular Technology Conference, Sep. 26, 2004, pp. 1614-1618, vol. 3, IEEE.

(Continued)

*Primary Examiner* — Siu Lee
(74) *Attorney, Agent, or Firm* — Coats & Bennett, PLLC

(57) ABSTRACT

The MIMO method and apparatus disclosed herein improve throughput conditions limited by multiplicative noise by reducing the gain of the data streams associated with one or more dominant signal paths between MIMO communication nodes. As used herein, multiplicative noise refers to any noise dependent on or proportional to a signal strength at a transmitting node and/or a receiving node of a wireless communication network. An additional method and apparatus are included for determining that multiplicative noise limits the throughput conditions.

59 Claims, 10 Drawing Sheets

(56) References Cited

OTHER PUBLICATIONS

Lozano, A. et al., "Mercury/Waterfilling: Optimum Power Allocation with Arbitrary Input Constellations", International Symposium on Information Theory, Proceedings, Sep. 4, 2005, pp. 1773-1777, IEEE.

Yoo, T. et al. "Multi-Antenna Downlink Channels with Limited Feedback and User Selection." IEEE Journal on Selected Areas in Communications, vol. 25, No. 7, Sep. 2007, pp. 1478-1491.

Grant, S. et al. "Performance Enhancement Through Joint Detection of Cochannel Signals Using Diversity Arrays." IEEE Transactions on Communications, vol. 46, No. 8, Aug. 1998, pp. 1038-1049.

* cited by examiner

ANTENNA RECONFIGURATION FOR MIMO COMMUNICATIONS WHEN MULTIPLICATIVE NOISE LIMITED

BACKGROUND

Multiple Input Multiple Output (MIMO) communication is becoming an integral part of current and future wireless communication standards. Using multiple transmit and receive antennas, MIMO communications enable multiple data streams to be conveyed simultaneously and independently between the transmitter and the receiver without consuming additional bandwidth or other radio resources. To that end, the transmitter and/or receiver comprise an antenna array having multiple antennas, each associated with a variable antenna weight, where the antenna weights at the transmitter are generally referred to as pre-coders. Through the use of the weighted transmitter and/or receiver antennas, different patterns may be formed for different data streams. If the wireless radio channel exhibits rich scattering, e.g., low correlation or a small singular value spread, then multiple possible propagation paths exist between the transmitter and receiver, allowing different data streams to be transmitted by orthogonal mapping over the different paths.

The receiver must process the received composite signal to separate and decode each of the transmitted data streams. To that end, conventional systems use linear receivers, e.g., minimum mean square error (MMSE) receivers, or non-linear receivers, e.g., maximum likelihood (ML) receivers. The ability of either type of receiver to separate the transmitted data streams present in a received composite signal depends on the orthogonality between the channels of the individual data streams. In general, the separation will not be perfect, leading to inter-stream interference, which limits the achievable signal-to-noise ratio (SNR) or signal-to-interference plus noise ratio (SINR) for each signal stream. The more the data stream channels resemble each other, the more difficult it will be for the receiver to separate the data streams. Channel similarity may be expressed based on the cross-correlation of the channels, through an alternative measure known as the singular value spread (which is derived based on the channel). A large singular value spread indicates highly similar channels, and thus, a difficult receiver problem. Therefore, the best conditions for MIMO communications occur when the SNR or SINR is high and the wireless channel experiences rich scattering, as indicated by low correlation or a small singular value spread.

Unfortunately, to some extent the beneficial channel conditions for MIMO are mutually exclusive, meaning the highest SNR or SINR conditions often occur at the same time as the lowest experienced channel richness, and vice versa. This problem may be exacerbated when one or more dominant data streams overpower weaker multi-path data streams. As used herein, a dominant data stream or a dominant signal path is defined as the data stream or path associated with a dominant mode, a dominant eigenmode, and/or a line-of-sight (LOS) path. For example, a large singular value spread or a large amplitude difference between the data streams in the received composite signal (e.g., due to a dominant LOS data stream) may cause some of the weaker data streams to end up with low SNRs. In response, the receiver may try to optimize the throughput by requesting a lower rank transmission (i.e., to reduce the number of data streams) to avoid wasting power on data streams where little to no throughput is expected, and by requesting a power increase for the data streams where the SNR gain will translate into improved throughput.

Requesting a power increase, however, can exacerbate noise conditions proportional to or dependent on the signal strength, i.e., multiplicative noise, particularly when such noise conditions limit the throughput conditions. Further, the use of fewer data streams leads to lower peak data rates over the wireless connection, which is expected to become even more problematic as standards and technology trend towards transmitters and receivers capable of handling larger numbers of signal streams. For example, both LTE release 10 and IEEE 802.11 ac have recently standardized up to 8×8 MIMO transmissions. Thus, there remains a need for improving MIMO throughput conditions limited by multiplicative noise.

SUMMARY

The MIMO method and apparatus disclosed herein improve throughput conditions limited by multiplicative noise by reducing the gain of the data streams associated with one or more dominant signal paths between MIMO communication nodes. As used herein, the term multiplicative noise refers to any noise dependent on or proportional to a signal strength at a transmitting node and/or a receiving node of a wireless communication network. Also as used herein, a dominant signal path comprises any path associated with a data stream that overpowers other data streams, and includes but is not limited to a path (or data stream) associated with a dominant mode, a dominant eigenmode, and/or a LOS signal path.

An exemplary method comprises determining that multiplicative noise limits the throughput conditions, and reconfiguring one or more antennas of a MIMO communication node to change the gain of the reconfigured antennas for the dominant signal path(s). In particular, the antennas are reconfigured to redirect a radiation pattern of each of the reconfigured antennas to reduce a gain of the reconfigured antennas for a dominant signal path between the MIMO communication node and a remote communication node.

An exemplary MIMO communication node comprises an antenna array having a plurality of antennas, a noise processor, and an antenna configuration unit. The noise processor is configured to determine that multiplicative noise limits the throughput conditions for the MIMO communication node. The antenna configuration unit is configured to reconfigure one or more of the antennas to redirect a radiation pattern of each of the reconfigured antennas to reduce a gain of the reconfigured antennas for a dominant signal path between the MIMO communication node and a remote communication node.

Another exemplary embodiment comprises a method of characterizing MIMO throughput conditions relative to multiplicative noise in a MIMO wireless communication system. The method comprises evaluating throughput conditions between a transmitting MIMO node and a receiving MIMO node based on at least one of a signal quality parameter and a MIMO utilization parameter. The method further comprises generating a multiplicative noise evaluation characterizing the MIMO throughput conditions relative to multiplicative noise based on the evaluated throughput conditions.

An exemplary noise processor is configured to characterize MIMO throughput conditions relative to multiplicative noise in a MIMO wireless communication system. The noise processor comprises a parameter unit and a characterization unit. The parameter unit is configured to evaluate throughput conditions between a transmitting MIMO node and a receiving MIMO node based on at least one of a signal quality parameter and a MIMO utilization parameter. The characterization unit is configured to generate a multiplicative noise evaluation characterizing the MIMO throughput conditions relative to multiplicative noise based on the evaluated throughput conditions.

DETAILED DESCRIPTION

The methods and apparatuses disclosed herein improve the achievable MIMO throughput in conditions where the MIMO throughput is limited by multiplicative noise, e.g., phase noise or quantization errors in the equipment, rather than by additive noise, e.g., thermal noise or interference. To that end, one or more antennas are reconfigured when multiplicative noise limits the throughput conditions to reduce a gain of data signals associated with one or more dominant signal paths. The following describes the invention in terms of a line of sight (LOS) signal path. It will be appreciated, however, that the present invention is applicable for MIMO conditions having any type of dominant signal paths, including but not limited to a path or data stream associated with a dominant mode, a dominant eigenmode, and/or a LOS signal path. Before discussing this further, the following first provides details regarding MIMO communication systems and the associated problems.

Figure 1:
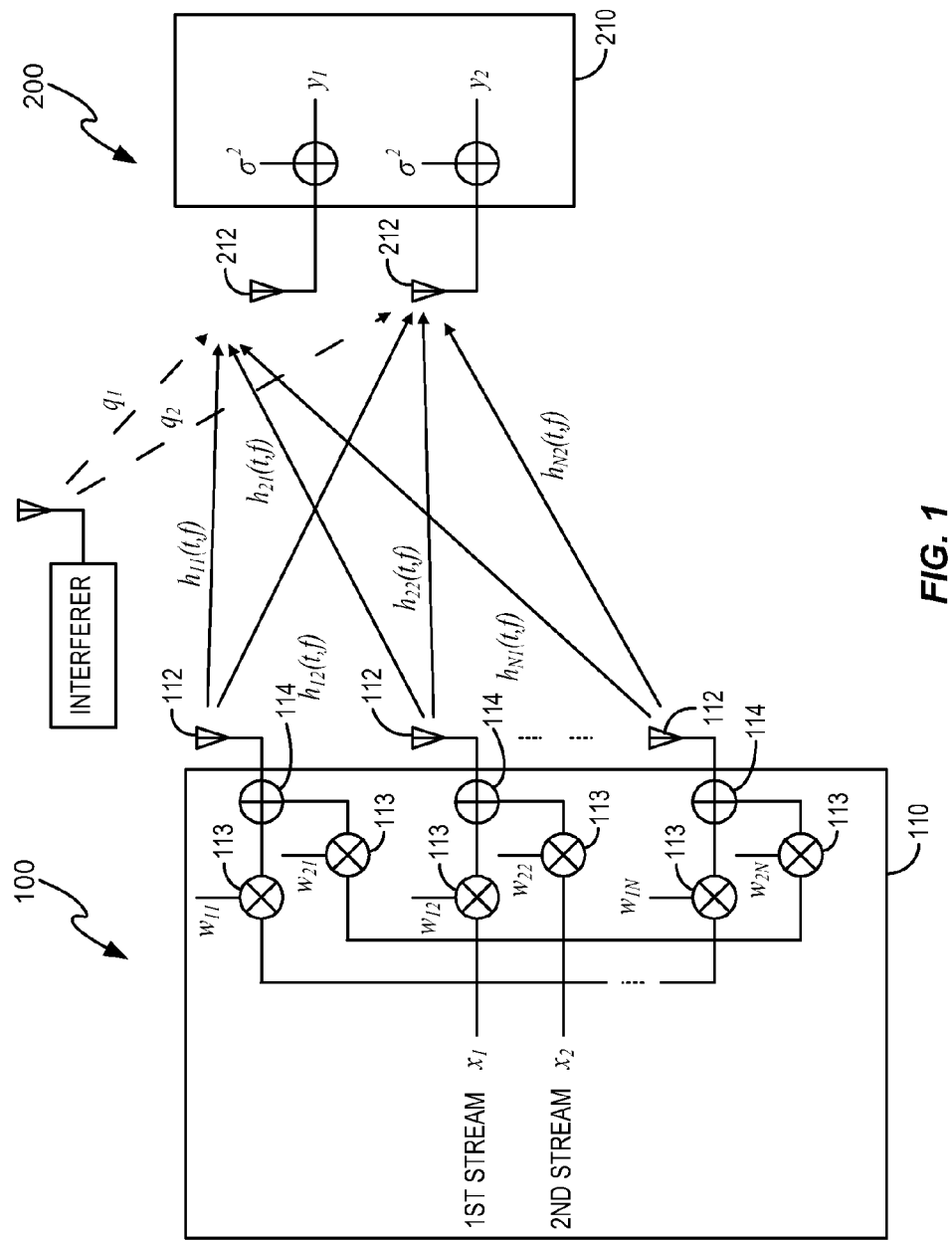
FIG. 1 shows a block diagram of an exemplary MIMO communication system.

FIG. 1 shows a block diagram of a MIMO communication system comprising two MIMO communication nodes, e.g., a transmitter node 100 and a receiver node 200. It will be appreciated that each MIMO communication node 100, 200 may comprise any one of a pico site, a radio base station (including a NodeB and an eNodeB), an access point, a relay, a wireless backhaul node, a user equipment or other wireless device, or any node within the wireless network capable of transmitting and receiving signals. Each MIMO communication node 100, 200 comprises an antenna array 110, 210 having multiple antennas 112, 212. Each of the N antennas 112 of the transmitter node 100 is associated a multiplier 113 and a combiner 114. Each multiplier 113 applies a weight (pre-coder) to one of the B input data streams $x_b$, and the combiner 114 combines the weighted data streams to generate a composite signal for transmission from the corresponding antenna 112. In the example of FIG. 1, B=2 for simplicity. It will be appreciated, however, that any number of data streams up to B=N may be used.

More particularly, multipliers 113 apply a first column vector of weights $w_1=[w_{11}; w_{12}; w_{13}; \ldots; w_{1N}]$, which may be frequency dependent, to a first data stream $x_1$ for transmission from antenna array 110. Different combinations of weights correspond to different radiation patterns through the antenna array response $a(\theta,\phi)=[a_1; a_2; a_3; \ldots; a_N]$, where:

$$a_n(\theta,\phi)=g_n(\theta,\phi)e^{jk \cdot r_n}. \tag{1}$$

In Equation (1), k represents the wave vector $2\pi/\lambda n$ where n represents a unit vector in the direction $(\theta,\phi)$, $r_n$ represents the antenna displacement vector, and $g_n(\theta,\phi)$ represents the per-antenna gain vector. While $g_n(\theta,\phi)$ is shown here as a scalar, it will be appreciated that $g_n(\theta,\phi)$ may be generalized to polarized antennas and channels. The shape $G_1(\theta,\phi)$ of the radiation pattern used to transmit data stream $x_1$ becomes:

$$G_1(\theta,\phi)=w_1^T a(\theta,\phi). \tag{2}$$

A second data stream $x_2$ may be transmitted using the same antenna array 110 using the weights $w_2=[w_{21}, W_{22}, W_{23}, \ldots, w_{2N}]$. In general, up to N data streams can be transmitted simultaneously. The total transmitted signal may be represented by the superposition:

$$W_{TX}x=w_1 x_1+w_2 x_2. \tag{3}$$

The application of weights $W_{TX}=(w_1, w_2)$ at the transmitter node 100 is generally referred to as pre-coding.

The receiver node 200 also comprises an antenna array 210 of M antennas 212, where the radio channel between the $n^{th}$ transmitting antenna 112 and the $m^{th}$ receiving antenna 212 may be expressed as $h_{nm}$, where $h_{nm}$ may be time-dependent and/or frequency-dependent. While not shown, the receiver node 200 may also apply different weight vectors to the antenna array 210 for different received signals. In matrix notation, the received signal $y=[y_1, y_2, y_3, \ldots, y_M]$ may be expressed as:

$$y=(I+\Sigma_{rx})H(I+\Sigma_{tx})W_{TX}x+\Sigma+Q, \tag{4}$$

where the diagonal matrixes $\Sigma_{rx}$ and $\Sigma_{tx}$ represent multiplicative noise, including but not limited to phase noise and quantization errors, H represents a matrix of the channel estimates, $\Sigma$ represents additive noise, including but not limited to thermal noise, and Q represents the interference.

The receiver node 200 is thus tasked with the problem of separating the received composite signal y into the individual data streams $x_1, x_2, \ldots, x_N$ in order to successfully decode each data stream. This problem is generally complex, but it has been shown that in the absence of interference, phase noise, and dynamic range limitations, the optimal pre-coders and receive weight vectors are given by the singular value decomposition (SVD) of the wireless channel. In particular, it has been shown that the receive weight vectors under these conditions may be given by $H=U \cdot S \cdot V$, where U represents the unitary pre-coding matrix, V represents the unitary receiver weight matrix, and S represents a diagonal matrix where each diagonal element represents the signal amplitude that a particular mode of communication will experience. Thus, for an M×N channel H, the diagonal matrix S will be of size M×N. In other words, the number of independent channels that can be transmitted over this channel is bound by min (M, N). If the channel H is rank-deficient, then some of the elements of S will be zero, further limiting the available number of data streams. In a noise-limited scenario, the total capacity R of the channel is known to be the sum of the Shannon capacity for each sub-stream, assuming equal and independent noise level $\sigma^2$ over the different receiver radio chains, as given by:

$$R = f_{BW} \sum_{n=1}^{N} \log_2\left(1 + \frac{P_n s_n^2}{\sigma^2}\right), \quad (5)$$

where $P_n$ represents the power allocated to the $n^{th}$ data stream and $f_{BW}$ represents the bandwidth.

In general, finding and utilizing the SVD requires full channel knowledge at the transmitter node 100, something which is costly to obtain in practical circumstances. In particular, full feedback of all channel coefficients $h_{nm}$ may require a prohibitive amount of reverse link capacity, especially when $h_{nm}$ is time- or frequency variant and the numbers N and/or M are large. Therefore, different lower-complexity schemes have been devised. One such scheme relies on quantized feedback of preferred pre-coders based on a previously agreed codebook, known as closed-loop pre-coding. Closed-loop pre-coding is a part of standards including but not limited to 3GPP UMTS and 3GPP LTE. The closed-loop codebook consists of a finite number of available pre-coding matrixes $W_{TX}$ for each rank (e.g., for each number of data streams to be transmitted). The receiver node 210 estimates the channel H, typically using reference symbols or pilots transmitted from each of the transmit antennas 112, as well as the noise and interference level, using any known technique. Next, the receiver node 200 evaluates all possible pre-coding matrixes and searches for the one that will result in the best utilization of the available radio resources, which is typically the rank and pre-coder that results in the highest data rate throughput given the estimated SNR or SINR. Once this is found, the receiver node 200 signals the desired rank and pre-coder on the reverse link to the transmitter node 100 to indicate the receiver node's preference, typically using a Rank Indicator (RI) and a pre-coding matrix indicator (PMI). In addition, the receiver node 200 may signal back the perceived channel quality using a Channel Quality Indicator (CQI) that it expects to experience with the selected pre-coder, to allow the transmitter node 100 to adjust the coding and modulation scheme optimally, a process known as link adaptation. The transmitter node 100 may in some cases be required to use the preferred pre-coding indicated by the receiver node 200. In other cases, the transmitter node 100 may override the recommendation at its discretion, e.g., due to circumstances unknown to the receiver node 200, e.g., the existence of additional receivers, scheduling priorities, non-full data buffers, etc. While possible, such an override may obsolete the CQI feedback because was generated based on the receiver's preferred pre-coder, which typically renders link adaptation more challenging. Another MIMO scheme included in the same wireless communication standards is the so-called open-loop pre-coding. In this scheme, no channel or preferred pre-coder information is fed back to the transmitter node 100, although CQI and rank feedback are still used. Instead the transmitter node 100 will typically send information with a fixed pre-coder or a pre-coder that cyclically varies in time and/or frequency. Additionally, when multiple data streams are transmitted, the pre-coders are usually mixed in order to provide the same channel quality for all data streams. Open-loop pre-coding is suboptimal compared to closed-loop pre-coding. At high signal to noise ratios, however, the difference between the two diminishes. In particular, the closed-loop scheme will essentially find good pre-coders that result in good data stream separation and high per-stream SNRs at the receiver node 200, while the open-loop scheme instead relies on a high likelihood of using sufficiently good pre-coders and the ability of the receiver node 200 to separate the streams. The closed-loop scheme is sensitive to noisy channel estimates, which might result in non-optimal pre-coders. Also the reported pre-coder might be outdated by the time the transmitter node 100 uses it for the actual transmission. The open-loop scheme, on the other hand, relies on diversity and uses a wide range of different pre-coders. Thus, the open-loop scheme will not be optimal, but it is less sensitive to noise and timing issues.

Regardless of whether the system uses a closed-loop or open-loop pre-coding scheme, the receiver node 200 processes the received composite signal to decode each of the data streams. Because the channel will typically mix the data streams, as is evident from Equation (4), signal processing is required to separate the data streams. Many different MIMO receiver structures are known in the art. Broadly, these fall in to two categories: linear receivers and non-linear receivers. The operation of a linear receiver may be expressed by a linear operator operating on the received signal vector y according to $\hat{x} = W_{RX} y$, where $W_{RX}$ represents the receiver weight matrix. An example of a linear receiver is the minimum mean square error (MMSE) receiver, which selects weights $W_{RX}$ such that the mean square error between the transmitted and the estimated symbols is minimized in the presence of additive noise and interference. The MMSE receiver is equivalent to a zero-forcing receiver in the case where no noise or interference exists. The operation of a non-linear receiver relies on the use of more complex operations, e.g., multi-stage operations. An example of a non-linear receiver is the Maximum Likelihood (ML) receiver or the Successive Interference Cancellation (SIC) receiver.

The ability of receiver node 200 to separate the data streams depends on the orthogonality between the data stream channels. In general the separation will be non-perfect, leading to inter-stream interference which limits the achievable SINR for each stream. The more the data stream channels resemble each other, the more difficult the separation will be, leading to lower effective SINRs on each substream. Channel similarity is often expressed by the cross correlation, though an alternative measure is the singular value spread. The cross correlation coefficient of two channel coefficients $h_1$ and $h_2$, for example, may be defined by:

$$\rho_{12} = \frac{E\{h_1 h_2^*\}}{\sqrt{E\{h_1 h_1^*\} E\{h_2 h_2^*\}}}, \quad (6)$$

and is typically estimated by the sample cross correlation:

$$r_{12} = \frac{\sum_{k=1}^{K} \tilde{h}_1(k) \tilde{h}_2^*(k)}{\sqrt{\sum_{k=1}^{K} \tilde{h}_1(k) \tilde{h}_1^*(k) \sum_{k=1}^{K} \tilde{h}_2(k) \tilde{h}_2^*(k)}}, \quad (7)$$

where $\tilde{h}_1(k)$ and $\tilde{h}_2(k)$ represent sequences of (typically noisy) channel estimates of the channels $h_1$ and $h_2$. The singular value spread is derived from the singular value matrix S (derived from the channel H). A simple measure of this spread is the ratio of the largest and the smallest singular value, e.g., $$\frac{s_{max}}{s_{min}}.$$

Large correlations between the elements of the channel matrix H implies a large singular value spread and hence a difficult receiver problem.

In the case that multiple streams are transmitted, the power per data stream will be lower than if fewer or a single data stream is transmitted. Successful link adaptation thus requires finding the optimal number of data streams to transmit, and also the power to use for each data stream. This optimum will be SNR-dependent. At low SNRs it is typically better to allocate all power to one data stream, while at higher SNRs the available transmit power may be equally shared across data streams while still maintaining a sufficiently high per-stream SNR to allow a high order of modulation and coding. It has been shown that an optimal per-stream power allocation, in the absence of interference, phase noise, and dynamic range limitations, is given by a "water filling" solution in which power is allocated proportional to the per-stream SNR, but only to those streams that have an SNR exceeding a certain threshold. However existing cellular standards tend to share transmit power equally across the data streams. As seen in Equation (5), data streams with poor conditions (weak $s_n$) will not contribute as much to the total throughput as data streams with good conditions (strong $s_n$) due to the $\log_2$ expression. The best conditions for MIMO communications thus occur when the SNR or SINR is high and the wireless channel experiences rich scattering, e.g., low correlation or a small singular value spread.

In cellular communication systems, where multiple transmitters and receivers in different cells (or even the same cell) re-use the same radio resources, e.g., time slots and/or frequency bands, there will be interference between the transmissions. In addition, the further the receiver node 200 is from the transmitter node 100, and the more obstacles in between that block the direct radio path, the weaker the received signal will be. Thus, the signal levels tend to be highest when there is line of sight (LOS) path between the desired transmitter-receiver pair, and no LOS path for the interfering transmitters.

Figure 2:
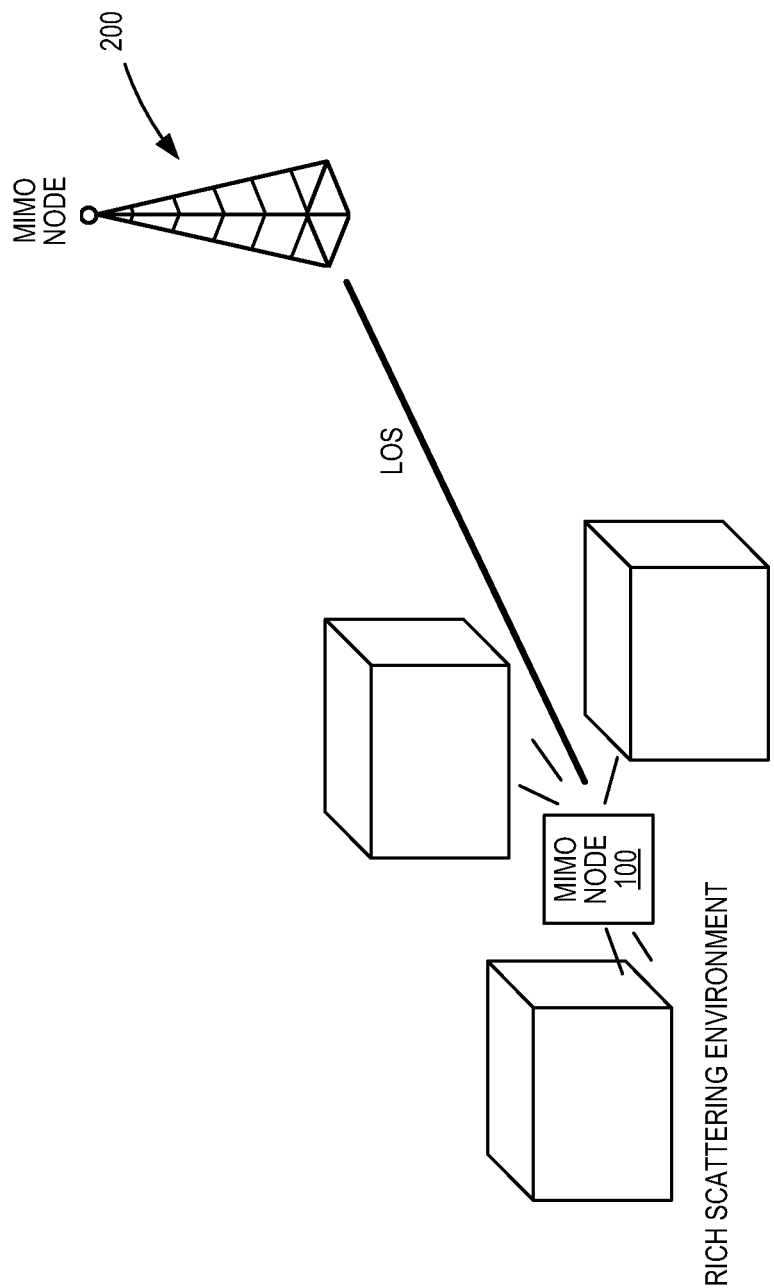
FIG. 2 shows an exemplary rich scattering environment.

However, the channel gain of the data stream utilizing the LOS path and the others differ substantially as the scattered paths are much weaker, as shown in FIG. 2. In order to utilize the scattered paths in combination with the strong LOS path, the receiver node 200 needs a very large dynamic range (on the order of 50-60 dB), which in most practical cases is not possible. The beneficial channel conditions for MIMO are thus to some extent mutually exclusive, because the highest SNR or SINR conditions occur at the same time as the lowest experienced channel richness, and vice versa. It is possible to utilize antenna polarization to maintain good sub-channel isolation even in the presence of a dominant LOS path signal, e.g. by transmitting and receiving streams with orthogonally polarized antennas. However, this ability is restricted to the two polarizations possible for a plane wave.

In addition, various transmitter and receiver impairments will further exacerbate the problems of channel richness and of inter-stream interference. For example, non-linearities in the transmitter node 100 may cause a power-dependent error floor of the transmitted symbols. This error is commonly characterized by the Error Vector Magnitude (EVM), which is defined as the error of a complex modulation symbol divided by the amplitude of that symbol. Typical sources of EVM include thermal and phase noise, the dynamic range of the Digital-to-Analog (D/A) converter, quantization errors in the digital representation of the transmitted signals, and saturation or clipping in the power amplifiers. Similarly, the receiver node 200 may also suffer from various impairments that can be characterized by a receiver EVM. The EVM in the transmitter node 100 and/or receiver node 200 may be reduced by using more expensive, high quality components and complex circuitry. However, the cost-benefit trade-off in commercial and mass-market communication equipment usually leads to EVM values of at best around 3% or −30 dB. As a result, the SNR that the receiver experiences on its channel estimates will be upper limited by ~30 dB. A large singular value spread or data stream amplitude spread will cause some of the weaker of the potential MIMO data streams to end up with low or negative (in dB) estimated SNRs. As the receiver node 200 tries to optimize the throughput it will most likely request a lower rank transmission to avoid wasting power on streams where little or no throughput is expected, and instead increase the power of the stronger data streams where the SNR gain will translate into a larger throughput gain. The fact that the channel estimates for the weaker data streams will be noisier also has consequences for the capabilities of the MIMO receiver node 200 to suppress the inter-stream interference, which further discourages the use of many streams.

Figure 3:
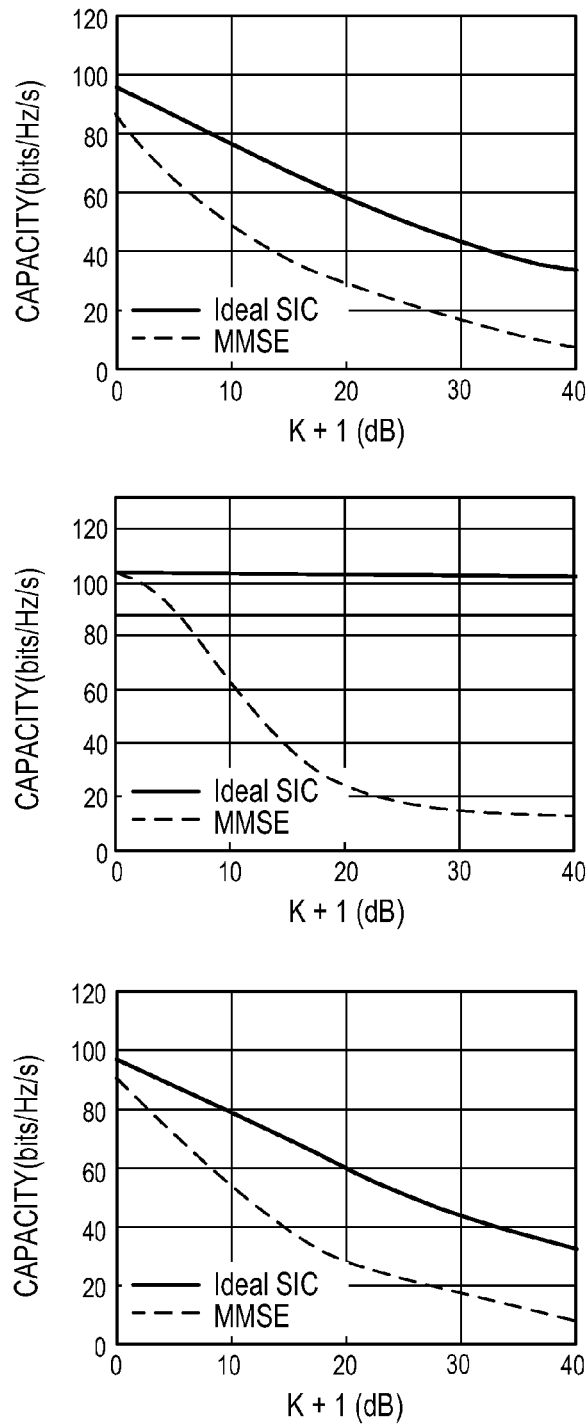
FIG. 3 shows the effect of multiplicative noise in a MIMO communication system.

FIG. 3 shows the effect of multiplicative noise (e.g., noise that depends on signal strength, e.g., phase noise) at the level of −30 dB when equal power is allocated to all data streams. FIG. 3A applies when only the receiver node 200 is multiplicative noise limited. FIG. 3B applies when only the transmitter node 100 is multiplicative noise limited. FIG. 3C applies when the transmitter node 100 and the receiver node 200 are equally multiplicative noise limited. A performance degradation of 50% or more will occur when the Ricean K value (i.e., the ratio of the power in the LOS path to the power in the non-LOS paths) is larger than 10 dB and 25 dB for an MMSE receiver and an ideal successive interference cancellation (SIC) receiver, respectively. This level of degradation is likely to occur in real networks that use higher order MIMO transmission schemes, as K values at the order of 10 dB or larger are likely due to LOS conditions. It should be noted that the additive noise in this case is well below the multiplicative noise, and thus the throughput is limited by the multiplicative nose. Moreover, for the case where the multiplicative noise occurs only in the transmitter node 100, no degradation is observed for an ideal SIC receiver.

The use of fewer MIMO data streams leads to lower peak data rates over the wireless connection, because the data rate per data stream is typically limited by the highest modulation and coding scheme for which equipment and standard is prepared. This effect has been observed in deployed systems, typically in situations where there LOS conditions exist between the transmitter node 100 and receiver node 200. The degradation can be quite large; the throughput can drop by a factor of 2 or even 3 compared to non-LOS (NLOS) conditions. Examples include situations where the terminal passes into a LOS path at a street corner; thus, the effect can be very rapid. The problem increases the higher the number of transmit and receive antennas there are in the MIMO link. As both LTE release 10 and IEEE 802.11ac have recently standardized up to 8×8 MIMO configurations, the problem is expected to become even more evident as 8-antenna products become available.

Figure 4:
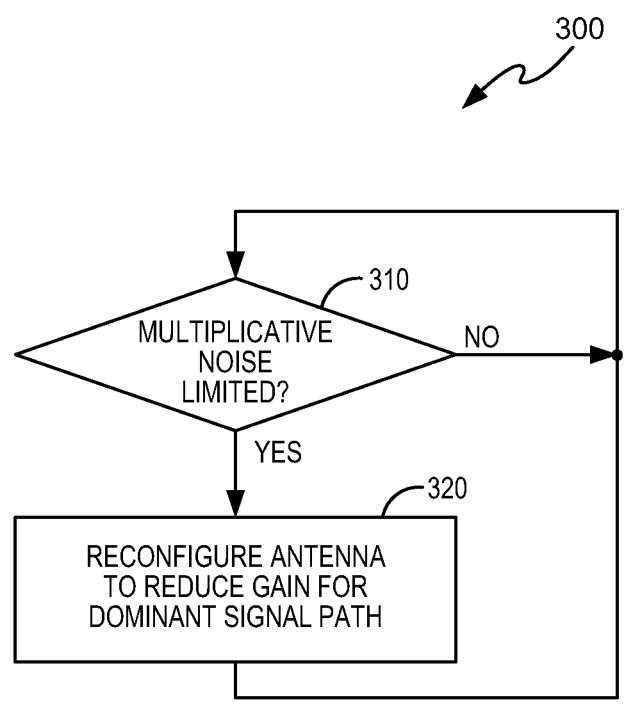
FIG. 4 shows a method for improving throughput conditions according to one exemplary embodiment.
Figure 5:
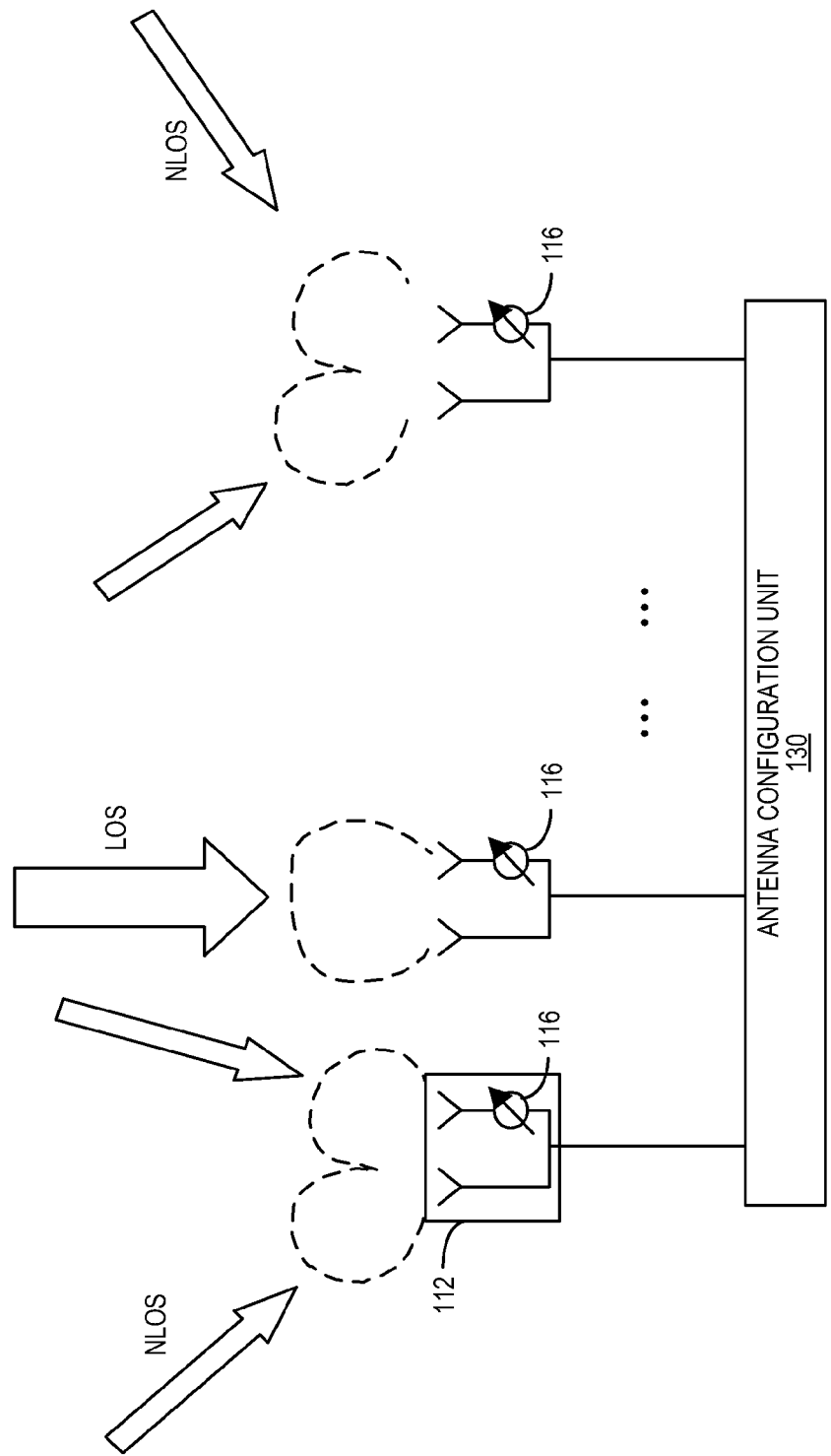
FIG. 5 shows the effects of reconfiguring the antennas according to one exemplary embodiment.
Figure 6:
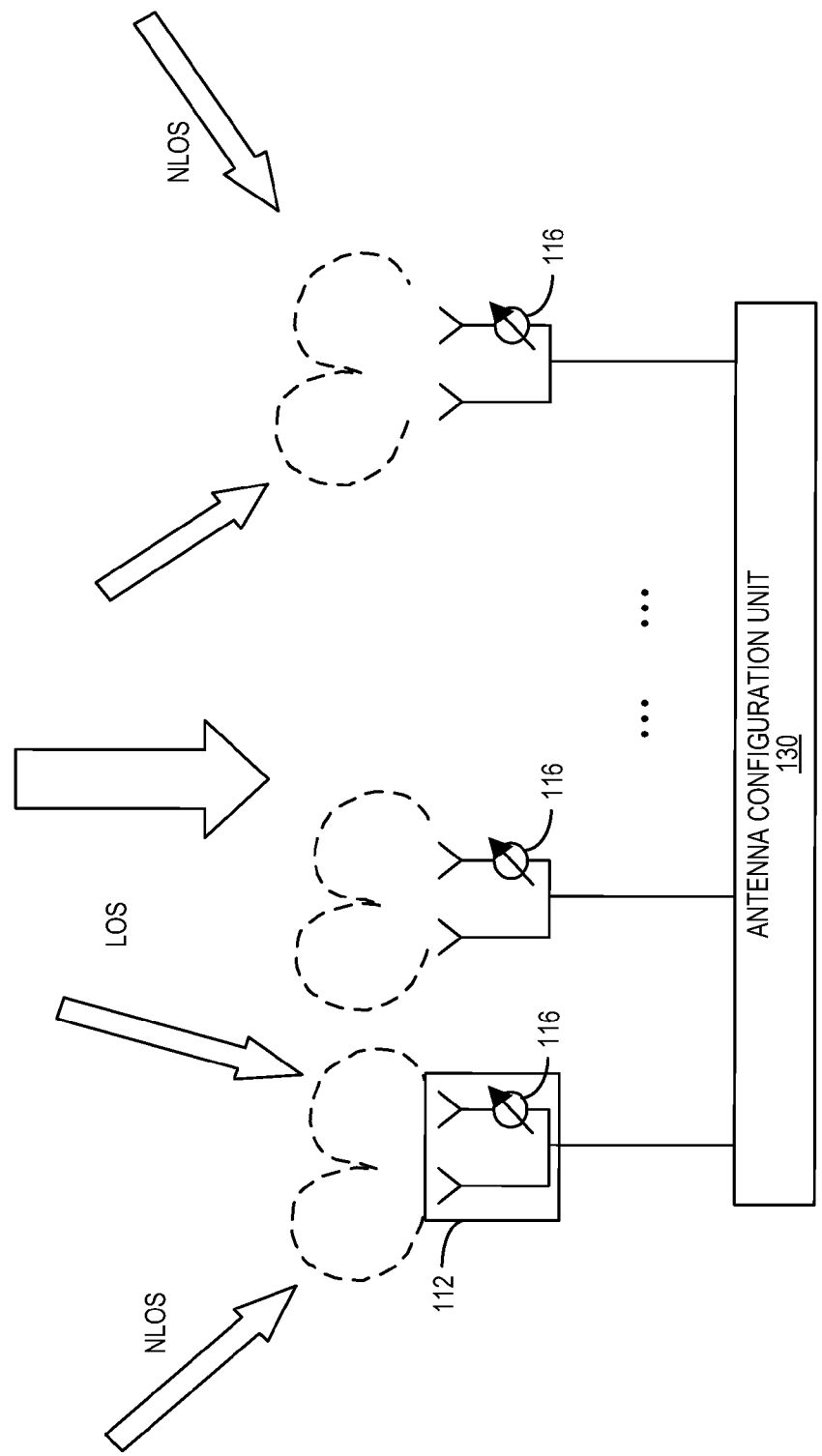
FIG. 6 shows the effects of reconfiguring the antennas according to another exemplary embodiment.

FIG. 4 shows an exemplary method 300 that may be used to improve throughput conditions between a MIMO transmitter node 100 and a MIMO receiver node 200 when the MIMO throughput is limited by multiplicative noise. When it is determined that the throughput is limited by multiplicative noise (block 310), one or more antennas 112, 212 are reconfigured to reduce a gain for the dominant signal path (block 320). Reconfiguring some number of the antennas 112, 212 in this manner prevents the weak NLOS signal components from being hidden by the dominant LOS signal components. More particularly, one or more of the antennas are reconfigured to redirect a radiation pattern of each of the reconfigured antennas to reduce a gain of the reconfigured antennas for a dominant signal path between a MIMO transmitter node 100 and a MIMO receiver node 200. In one exemplary embodiment, the antenna array 110, 210 may be reconfigured such that only one antenna 112, 212 receives the signal from the dominant signal path direction, e.g., the LOS direction, while the remaining antennas 112, 212 are reconfigured to steer them away from the direction of the dominant signal path (FIG. 5). In another exemplary embodiment, one or more antennas may be reconfigured by steering the antenna gain of all of the antennas away from a dominant signal path, e.g., a LOS signal path (FIG. 6). Further details regarding these embodiments are discussed further herein.

Figure 7:
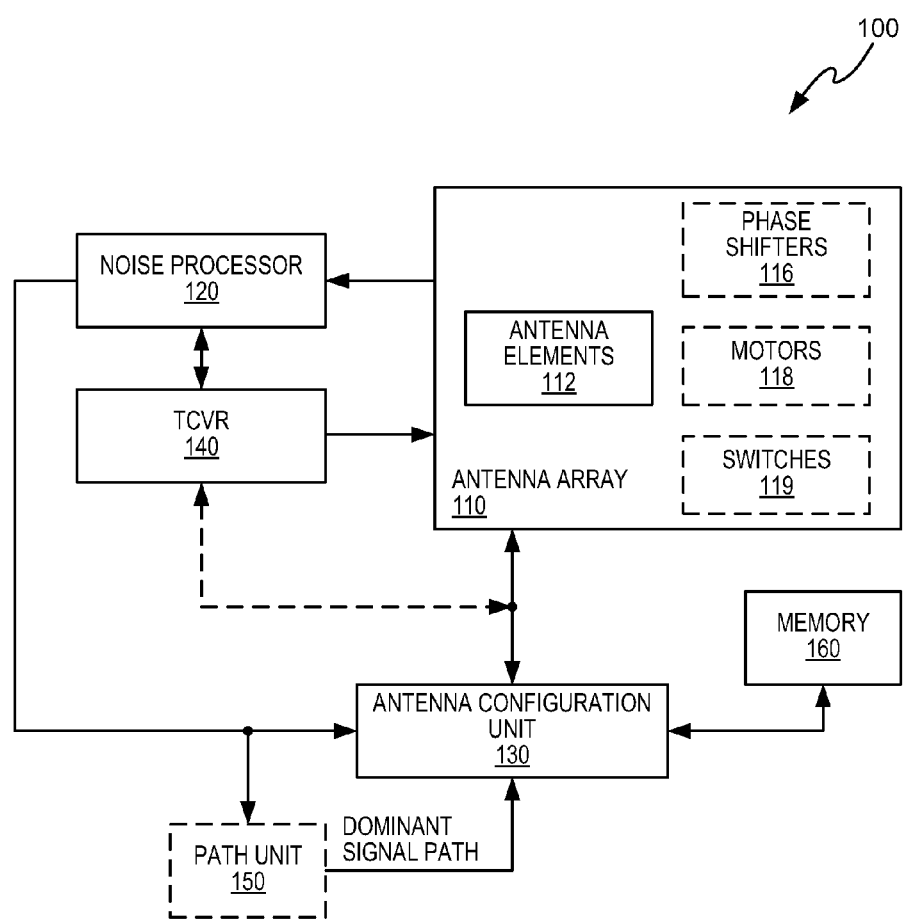
FIG. 7 shows a block diagram of an exemplary transmitter node in the MIMO communication system.

FIG. 7 shows an exemplary MIMO node 100, 200 configured to implement the method of FIG. 4. In addition to the antenna array 110, 210 shown in FIG. 1, MIMO node 100 comprises a noise processor 120, an antenna configuration unit 130, a transceiver 140, an optional path unit 150, and a memory 160. Noise processor 120 is configured to determine whether multiplicative noise limits the MIMO throughput conditions. Antenna configuration unit 130 is configured to reconfigure the antenna(s) 112, 212 to redirect the radiation pattern of each of the reconfigured antennas 112, 212 to reduce a gain of the reconfigured antennas 112, 212 for a dominant signal path between the MIMO transmitter node 100 and the MIMO receiver node 200. Memory 160 is configured to store any information useful for operation of the node 100, 200. It will be appreciated that the antenna reconfiguration disclosed herein may be implemented by the transmitter node 100, the receiver node 200, or both the transmitter and receiver nodes 100, 200.

Antennas 112, 212 may be reconfigured using any known means, including through the use of phase shifters 116, motors 118, and/or switches 119. For example, in one exemplary embodiment the antenna array 110, 210 comprises a phase shifter 116 operatively coupled to one antenna element of each antenna 112, 212 (see FIGS. 5 and 6). In this embodiment, the antenna configuration unit 130 reconfigures the antennas 112, 212 by controlling the phase shifters 116 of the reconfigured antennas 112, 212 to achieve the desired radiation pattern. Alternatively or additionally, the antenna array 110, 210 may include a motor 118 for each of the antennas 112, 212, where the antenna configuration unit 130 reconfigures the antennas 112, 212 by controlling the motors 118 of the reconfigured antennas 112, 212 to achieve the desired radiation pattern. In still another embodiment, each antenna 112, 212 may comprise a parasitic antenna element an active antenna element, and a switch 119 coupled to the parasitic and active antenna elements, where the antenna configuration unit 130 controls the switches 119 to electrically or mechanically switch between the active and parasitic antenna elements to achieve the desired radiation pattern.

In one exemplary embodiment, antenna configuration unit 130 reconfigures the antenna(s) 112, 212 such that a first antenna 112, 212 receives the signal in a LOS direction, while steering the remaining antennas 112, 212 away from the LOS direction such that the remaining antennas 112, 212 receive signals from the NLOS directions while suppressing the signal from the LOS direction. It will be appreciated that when antenna array 110, 210 comprises dual polarization reconfigurable antennas 112, 212, each having dual polarized antenna elements, where one reconfigurable antenna for each polarization may be directed towards the LOS direction. In any event, antenna configuration unit 130 configures a "LOS" antenna 112, 212 to increase a gain of the LOS antenna 112, 212 for LOS direction while reconfiguring the remaining antennas 112, 212 to reduce the gain for the LOS direction. Such a configuration brings out the data streams associated with the previously hidden NLOS paths. Further, by keeping at least one antenna 112, 212 configured for the LOS direction, the LOS signal path may still be used for data transmission.

FIG. 5 shows one exemplary implementation for the embodiment that configures some number of antennas 112, 212 for the LOS direction. In this embodiment, each antenna 112, 212 comprises two antenna elements and a distribution network with a phase shifter 116. It will be appreciated that more than two antennas, and more than one phase shifter 116 may be used. By controlling the phase shifters 116, antenna configuration unit 130 changes the radiation pattern of the reconfigured antennas 112, 212 such that the gains of the radiation patterns become very low in the LOS direction for all but one of the antennas 112, 212. Such a configuration prevents the NLOS signals from being hidden by the strong LOS signals, which leads to higher rank for the MIMO channel matrix, and thereby improves the MIMO throughput. It will be appreciated that similar results may be achieved through the use of motors, switches, or other antenna configuration techniques.

In another exemplary embodiment, the antenna configuration unit 130 reconfigures the antenna(s) 112, 212 to steer the antenna gain of all of the antennas 112, 212 away from the LOS direction, as shown in FIG. 6. As a result, the signals traveling the NLOS signal paths are no longer hidden by the strong signals traveling the LOS signal path, enabling more data streams to be multiplexed into the transmission signal (e.g., higher N). This embodiment may be used at both the transmitter node 100 and the receiver node 200. Further, if there are multiple dominant signal paths between one or more transmitter nodes 100 and one or more receiver nodes 200, this embodiment may be used to reduce the gain of the reconfigured antennas 112, 212 in all of the LOS directions to bring out the previously hidden NLOS signal(s). Such a configuration removes the multiplicative noise-limited MIMO conditions, thereby increasing the achievable MIMO throughput. It will be appreciated that this embodiment may alternatively be implemented using motors 118, switches 119, or other antenna configuration techniques.

The antenna configuration unit 130 may determine how to reconfigure the antennas 112, 212 based on any number of techniques. For example, antenna configuration unit 130 may evaluate different antenna array configurations based on a measured MIMO operating parameter, e.g., by iteratively changing the antenna array configuration according to a predetermined pattern and evaluating the MIMO operating parameter for each iterative change. Subsequently, the antenna configuration unit 130 selects the antenna array configuration providing the best MIMO operating parameter. In this example, the antenna configuration unit 130 reconfigures the antenna(s) according to the selected antenna array configuration. In another example, antenna configuration unit 130 reconfigures the antenna(s) 112, 212 based on an antenna configuration report received from a remote reporting node, e.g., the receiver node 200 or another remote network node.

Figure 8:
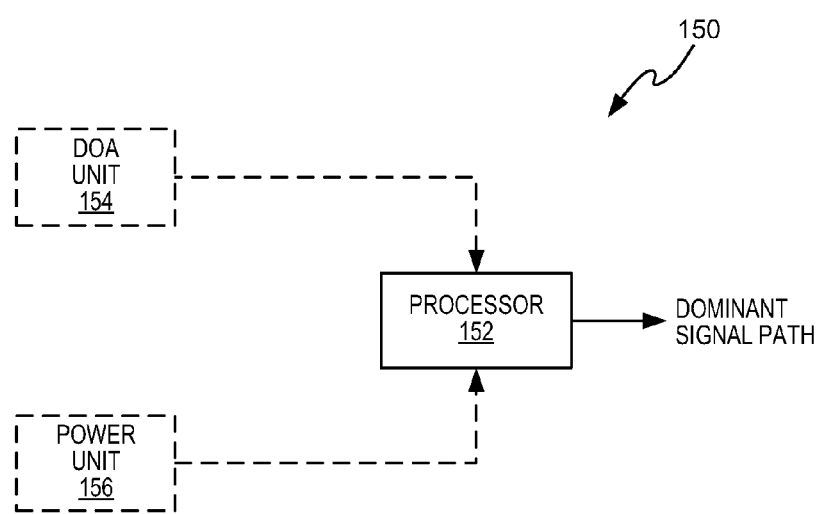
FIG. 8 shows a block diagram of a path unit according to one exemplary embodiment.

Referring again to FIG. 5, to facilitate the reconfiguration operations, MIMO node 100, 200 may further include a path unit 150 configured to identify the LOS path between the transmitter node 100 and the receiver node 200. In one exemplary embodiment, path unit 150 identifies the LOS path based on dominant signal path information received from a remote node, e.g., the receiver node 200 or another remote network node. In another embodiment, an exemplary path unit 150 comprises a processor 152 and an optional direction of arrival (DOA) unit 154, as shown in FIG. 8. DOA unit 154 is configured to estimate a DOA for each of two or more received signals received by transceiver 140 based on reference signals included in the received signals. For example, the DOA may be determined in the digital domain by processing the received cell-specific reference signals or channel state information reference signals. Processor 152 is configured to identify the LOS path based on the estimated DOAs.

According to another exemplary embodiment, path unit 150 includes an optional power unit 156 and the processor 152, where the power unit 156 is configured to determine a power associated with each of the antennas 112, 212. The processor 152 is configured to identify the LOS path based on a relative comparison between the determined powers. For example, for wireless links having throughput conditions limited by multiplicative noise, it is of interest to know which of the B data streams or pre-coders gives the highest received power, because it is the power and multiplicative noise associated with this data stream that causes the degradation for the weaker data streams. In some situations, such as for an LOS link with co-polarized antennas, there might be a single dominating path corresponding to one dominant pre-coder and data stream. In other situations, there might be two or more dominant paths/data streams of similar power, e.g., in a LOS link with dual-polarized antennas.

The power unit 156 may determine the power per data stream according to:

$$P_j = |H \cdot w_j|^2, \quad (8)$$

where $w_j$ represents the $j^{th}$ pre-coder vector of weights. This power may be determined for all possible pre-coder vectors, or for only those pre-coder vectors that correspond to the preferred or recommended pre-coder vectors (the number depending on the preferred or recommended rank). A MIMO node 100, 200 with limited channel state information, e.g., the transmitter node 100 in an FDD system, may instead utilize PMI and CQI feedback to determine dominating pre-coders. In some cases, CQI values are coupled directly to corresponding pre-coders, while in other cases one CQI value is coupled to a codeword that is mapped to multiple data streams. The CQI value, which is indicative of the estimated SNR (or power), may therefore uniquely identify one pre-coder, or it may identify the sum of two or more pre-coders. Either case provides beneficial information. Finally, a MIMO node 100, 200 with limited channel state information, e.g., a transmitter node 100 in an FDD system, may also utilize second order channel statistics measured on the reverse link, such as antenna correlations or direction estimation via various methods as known in the art, in order to determine which direction or pre-coder will give the highest received power in the receiver node 200.

As discussed herein, one or more of the antennas 112, 212 are reconfigured when multiplicative noise limits the throughput conditions, i.e., when the noise proportional to or dependent on the received (or transmitted) signal power experienced by the receiver node 200 on, e.g., its channel estimates, dominates. Thus, under such conditions, reducing the received/transmitted signal power corresponding to the strongest signal paths (e.g., the strongest channel eigenvalues) while maintaining the power corresponding to the weaker signal paths (e.g., the weaker channel eigenvalues) effectively results in significantly reduced multiplicative noise in the weaker signal paths. This is because the cross-talk from the strongest signal paths has been reduced, which in turn improves the per-data-stream SNR/SINR and subsequently the throughput over the wireless MIMO channel. If, on the other hand, the thermal noise and interference is stronger than the multiplicative noise then no such improvements are possible because any reduction in received (or transmitted) signal power will only degrade the SNR or SINR levels for all data streams.

Because the antenna reconfiguration disclosed herein depends on the knowledge of whether multiplicative noise limits throughput conditions, it is also beneficial to provide methods and apparatuses to detect when multiplicative noise limits the throughput. Multiplicative noise $N_\pi$ limits the throughput conditions when:

$$\frac{1}{N_\pi} \leq \frac{P_{sig}}{\sigma^2 + I}, \quad (9)$$

where $P_{sig}$ represents the signal power, $\sigma^2$ represents the thermal noise power, and $I$ represents the interference power. The multiplicative noise $N_\pi$ may be expressed as a combination of the multiplicative noise at the transmitter node 100 $\langle \Sigma_{tx}^2 \rangle$ and the multiplicative noise at the receiver node 200 $\langle \Sigma_{rx}^2 \rangle$ according to:

$$N_\pi = \langle \Sigma_{tx}^2 \rangle + \langle \Sigma_{rx}^2 \rangle. \quad (10)$$

The determination of whether multiplicative noise limits the throughput conditions may be made in the MIMO node 100, 200 reconfiguring the antennas 112, 212, or in a network node remote from the reconfiguring MIMO node 100, 200 that subsequently sends a quantitative or qualitative multiplicative noise evaluation to the reconfiguring MIMO node 100, 200. Further, multiplicative noise determination may be made along with the dominant path determination and separate from the antenna reconfiguration, e.g., in a separate node from the antenna reconfiguration. In this scenario, the multiplicative noise determination and/or the dominant path determination are reported to the reconfiguring node. For example, the noise processor 120 may report the multiplicative noise determination and the path unit 150 may report the dominant path determination.

Figure 9:
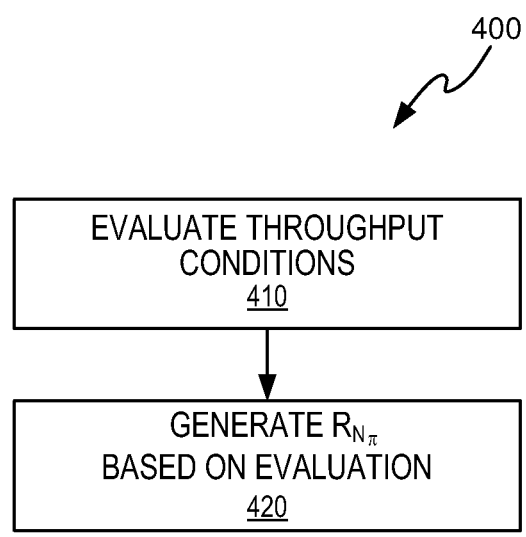
FIG. 9 shows a method of determining that multiplicative noise limits throughput conditions according to an exemplary embodiment.
Figure 10:
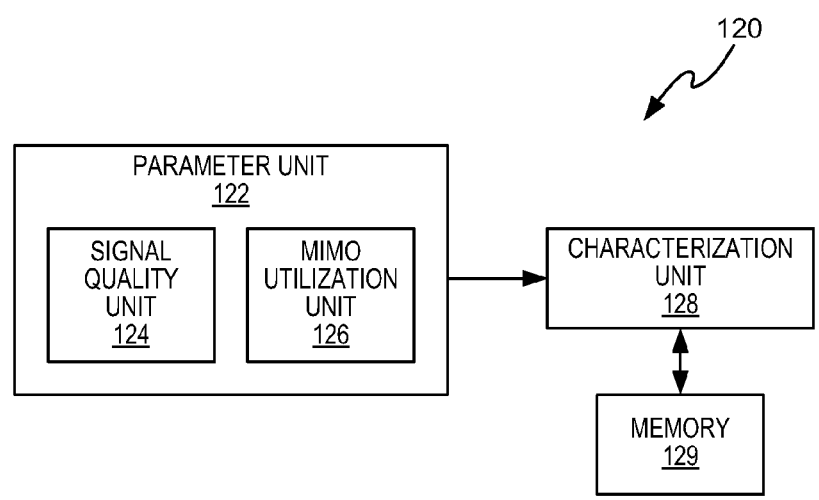
FIG. 10 shows a block diagram of a noise processor according to an exemplary embodiment.

FIG. 9 shows an exemplary method 400 for determining whether multiplicative noise limits throughput conditions as executed by a noise processor 120 comprising a parameter unit 122 and a characterization unit 128, as shown in FIG. 10. It will be appreciated that the noise processor 120 may be part of the transmitter node 100, the receiver node 200, or another node within the wireless network.

Parameter unit 122 evaluates the throughput conditions based on a signal quality parameter and/or a MIMO utilization parameter (block 410). Characterization unit 128 generates a multiplicative noise evaluation $R_{N_\pi}$ characterizing the MIMO throughput conditions based on the evaluated throughput conditions (block 420). In some embodiments, the multiplicative noise evaluation may comprise qualitative information, e.g., a simple "yes" or "no" indication. In other embodiments, the multiplicative noise evaluation may comprise quantitative information providing a qualitative assessment of the multiplicative noise, e.g., how much the multiplicative noise dominates the additive noise.

For example, in one embodiment, the parameter unit 122 may evaluate the throughput conditions by evaluating past observations, e.g., regarding whether multiplicative noise limited conditions previously existed for a particular cell, mobile device, location, etc. Such past observations may, for example, be stored in memory 129. In another embodiment, the parameter unit 122 comprises a signal quality unit 124 and a MIMO utilization unit 126. The signal quality unit 124 is configured to evaluate the throughput conditions by evaluating a signal quality parameter associated with the signals being communicated between two network nodes, while the MIMO utilization unit 126 is configured to evaluate the throughput conditions by evaluating a MIMO operating parameter associated with the communicated signals. Exemplary signal quality parameters include, but are not limited to, signal power, SNR, SINR, CQI report, etc. The signal quality unit 124 may estimate the SNR and/or SINR values during operation of the receiver node 200 using reference symbols, training sequences, or pilot signals, and/or a priori knowledge of the thermal noise level. The signal power and interference level can be measured directly using known techniques, or they could be inferred from predictions or measurements on the reverse link. Typically, the SNR or (SINR) estimates $\gamma$ will contain contributions from all noise (and interference) sources, including additive noise $\sigma^2$ and multiplicative noise $N_\pi$, e.g.,:

$$\gamma = \frac{P_{sig}}{N_\pi + \sigma^2 + I}. \quad (11)$$

Exemplary MIMO operating parameters include, but are not limited to, the throughput, rank indicator (RI), channel quality indicator (CQI), etc. The following provides multiple examples of different ways to determine whether multiplicative noise limits the throughput conditions. It will be appreciated that the claimed invention is not limited to these specific examples.

In a first exemplary embodiment, the characterization unit 128 compares the multiplicative noise $N_\pi$ with an SNR or SINR value $\gamma$ estimated by the signal quality unit 124. The multiplicative noise $N_\pi$ might be known beforehand, e.g. from the design or specifications of the radio equipment, or it may have been characterized during manufacturing and programmed into the corresponding network device. Alternatively, $N_\pi$ may be measured directly in conditions with high received signal power. For example, the highest estimated SNR value over a range of channel and interference conditions typically represents a good estimate of the multiplicative noise. In any event, the comparison may be performed in the noise processor 120 of the receiver node 200, in the noise processor 120 of the transmitter node 100 (using feedback information provided by the receiver node 200, reverse-link measurements, or utilizing channel reciprocity), or in a third network node. If needed, existing or new feedback or signaling mechanisms might be required to ensure that the $N_\pi$ and SNR/SINR estimates are available at the node performing the comparison.

In any event, when a multiplicative noise parameter ($1/N_\pi$) is less than or equal to $\gamma$, the throughput conditions are limited by multiplicative noise, as shown by Equation (9). Alternatively, a lower threshold may be used, e.g., if $\gamma$ is within some predetermined range, e.g., 3 dB, of $1/N_\pi$, then there is a high likelihood that the MIMO throughput will be limited by multiplicative noise. In yet another alternative, a $\gamma$ estimate that includes the effect of the multiplicative noise according to Equation (11) may be corrected according to:

$$\hat{\gamma} = \frac{1}{\frac{1}{\gamma} - N_\pi}, \quad (12)$$

where $\hat{\gamma}$ represents the corrected estimate corresponding to the additive receiver noise only. In this case, it should be noted that:

$$\frac{1}{\hat{\gamma}} - N_\pi = \frac{1}{\gamma} - 2N_\pi. \quad (13)$$

It is obvious that this expression is positive if:

$$\gamma > \frac{1}{2N_\pi} \quad (14)$$

In other words, the expression of Equation (13) is positive if $|\gamma|$ is within 3 dB of $1/N_\pi$. Multiplicative noise therefore limits the throughput conditions when Equation (14) holds true.

As noted above, the multiplicative noise evaluation for this exemplary embodiment may simply comprise a qualitative yes/no indication. Alternatively, multiplicative noise evaluation may be quantitative by indicating how much $\gamma$ exceeds $1/N_\pi$, e.g., by representing the results of Equation (14) with a certain numerical precision. Such quantitative information provides an understanding of how much the total received (transmitted) power can be changed without changing the $N_\pi$-dominance conditions.

In some cases, channel and $N_\pi$ estimates may be unreliable or even unavailable. In these cases, noise processor 120 in general, and MIMO utilization unit 126 in particular, uses secondary information to indirectly deduce whether multiplicative noise limits the MIMO throughput conditions. Because the primary difference between an $N_\pi$-limited MIMO link and a non-$N_\pi$-limited MIMO link is that only the latter will benefit from an increased received (transmitted) power level, this fact can be utilized to determine if the link is $N_\pi$-limited or not. Thus, the MIMO utilization unit 126 of one exemplary embodiment measures at least one MIMO operating parameter (throughput, RI, CQI, etc.) for at least two different power settings. Characterization unit 128 determines whether multiplicative noise limits the throughput conditions by comparing the measured MIMO operating parameters for the different power settings. For example, assume MIMO utilization unit 126 measures two operating parameters $M_1$ and $M_2$ at two different power settings $P_1$ and $P_2$, respectively, where $P_1 > P_2$. If $M_1$ and $M_2$ are substantially equal, or if $M_1 \leq M_2$, then characterization unit 128 indirectly determines that multiplicative noise limits the throughput conditions. To optimize the accuracy of this technique, the characterization unit must compare $M_1$ and $M_2$ measurements made under as similar channel and interference conditions as possible to avoid erroneous conclusions due to varying channel richness or interference. One simple way to achieve this is to first estimate $M_1$ for a particular time slot where the received (or transmitted) power is $P_1$ and subsequently estimate $M_2$ for another time slot where the received (or transmitted) power equals $P_2$. Alternatively, different frequency resources may be utilized, or even a combination of time slots and frequency slots. More generally, the channel and interference variations may be equalized between the two measurements by utilizing multiple time and frequency slots, or by utilizing diversity or coding techniques as known in the state of the art.

The powers may be varied either directly or indirectly. For example, the power may be directly varied at the transmitter using analog or digital methods, where the former includes attenuators or power amplifier settings while the latter may include changing the digital representation of the signals to be transmitter. At the receiver, the receiver preferably directly varies the power using analog methods because digital methods may reduce the additive noise by the same amount as the multiplicative noise. Alternatively, the naturally occurring power variation due to multipath fading may be utilized. Multipath fading causes the channel coefficients $h_{nm}$ to vary in time and/or frequency due to the constructive and destructive superposition of multiple radio waves. Therefore, parameter unit 122 may identify time instants or frequency bins where the power is closer to $P_1$ or $P_2$, where characterization unit 128 compares the measures $M_1$ and $M_2$ for these time instants or frequency bins. Because the channel richness also strongly depends on the multipath fading, however, such a method will be less precise. To compensate for this imprecision, some form of averaging over multiple observations may be used to improve the accuracy.

In another exemplary embodiment, the noise processor 120 may use a combination of signal quality parameters and MIMO utilization parameters. For example, low MIMO utilization may be caused by poor channel richness and/or $N_\pi$-limitations. However, the higher the signal quality or power, the more unlikely it is that MIMO utilization is limited by additive noise or interference. Therefore, a combination of high signal power and low MIMO utilization provides a strong indication of multiplicative noise limited conditions. Thus, for this third exemplary embodiment, MIMO utilization unit 126 provides a MIMO utilization measure $M_{MIMO}$ to the characterization unit 128, and signal quality unit 124 provides a signal quality measure $M_Q$ to the characterization unit 128. The characterization unit 128 combines $M_{MIMO}$ with $M_Q$ to determine whether multiplicative noise limits the throughput conditions. For example, the characterization unit 128 may determine that multiplicative noise limits the throughput conditions when $M_{MIMO} < M_{MIMO,ref}$ and $M_Q > M_{Q,ref}$, where $M_{MIMO,ref}$ and $M_{Q,ref}$ represent reference values. In some embodiments, $M_{Q,ref}$ depends on a MIMO utilization parameter. The reference values may be determined from simulations or from measurements under controlled conditions. For example, when $M_{MIMO}$ is the preferred rank RI while $M_Q$ is the CQI, a very high $M_Q$ indicates a low interference and noise condition, while a low $M_{MIMO}$ indicates a low MIMO utilization. The reference values could in this case be the CQI and RI values that, e.g., in simulations without $N_\pi$, are appropriate in channel conditions with typical channel richness. It will be appreciated that a network node 100 may calibrate the reference values $M_{Q,ref}$ and $M_{MIMO,ref}$ using both direct observations and indirect observations of $N_\pi$-limited conditions exist in parallel. These tuned reference values can then be used for the benefit of MIMO communications where only indirect observations are available.

In another exemplary embodiment, noise processor 120 may use past observations to predict whether a current transmitter-receiver link is likely to be subject to throughput conditions limited by multiplicative noise. The past observations may be from measurements with the same and/or different transmitter or receiver nodes, e.g. different terminals within the same cell area, and the observations may have been obtained with any of the methods described herein. For example, if multiple wireless terminals consistently report throughput conditions in a certain cell are limited by multiplicative noise, then noise processor 120 may use these observations to conclude that wireless terminals within the same cell are likely to experience throughput conditions limited by multiplicative noise. Similarly, if wireless terminals of a certain brand and/or type have reported multiplicative noise limited conditions at a particular received signal strength level, noise processor 120 may use this information to predict when other wireless terminals will experience the multiplicative noise limited throughput conditions. Further, positioning information may be used to further improve the detection of multiplicative noise limited conditions. For example, observations of multiplicative noise limited conditions may be tied to particular geographical areas with the help of positioning information available via numerous methods known in the art, e.g., GPS.

It will be appreciated that any one or more network nodes may implement the various operations disclosed here. For example, a first network node may determine whether multiplicative noise limits the throughput conditions, the same or a second network node may determine which pre-coder results in the high received power, and the same or a third network node may reconfigure the antennas. Whenever two or more nodes are involved, the information regarding the multiplicative noise limited conditions and/or the relevant pre-coders is communicated to the reconfiguring node, either directly or via one or more additional network nodes. Thus, different aspects of the embodiments disclosed herein may be implemented in different network nodes. Each such network node should therefore also be able to communicate with the other network nodes as needed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of improving throughput conditions in a wireless communication network for a wireless multiple-input, multiple-output (MIMO) communication node comprising an antenna array having a plurality of reconfigurable antennas, the MIMO communication node configured to communicate with a remote communication node, the method comprising:
    determining that multiplicative noise limits the throughput conditions, said multiplicative noise comprising any noise dependent on or proportional to a signal strength of at least one of the MIMO communication node and the remote communication node; and
    reconfiguring one or more of the reconfigurable antennas to redirect a radiation pattern of each of the reconfigured antennas to reduce a gain of the reconfigured antennas for a dominant signal path between the MIMO communication node and the remote communication node.

2. The method of claim 1 wherein the dominant signal path comprises a line of sight signal path between the MIMO communication node and the remote communication node.

3. The method of claim 1 wherein reconfiguring one or more of the reconfigurable antennas comprises applying a phase shift to one or more antenna elements of each reconfigured antenna to redirect the radiation pattern of the reconfigured antennas to reduce the gain of the reconfigured antennas for the dominant signal path.

4. The method of claim 1 further comprising configuring a first antenna of the antenna array to increase a gain of the first antenna for the dominant signal path, wherein reconfiguring one or more of the reconfigurable antennas comprise reconfiguring one or more of the remaining antennas to redirect the radiation pattern of each of the reconfigured antennas to reduce the gain of the reconfigured antennas for the dominant signal path between the MIMO communication node and the remote communication node.

5. The method of claim 1 wherein reconfiguring one or more of the reconfigurable antennas comprise reconfiguring all of the antennas of the antenna array to redirect the radiation pattern of each of the reconfigured antennas to reduce the gain of the reconfigured antennas for the dominant signal path between the MIMO communication node and the remote communication node.

6. The method of claim 1 wherein reconfiguring one or more of the reconfigurable antennas comprises:
evaluating different antenna array configurations based on a corresponding MIMO operating parameter;
selecting the antenna array configuration providing the best MIMO operating parameter; and
reconfiguring one or more of the reconfigurable antennas according to the selected antenna array configuration.

7. The method of claim 6 wherein evaluating the different antenna array configurations based on the corresponding MIMO operating parameters comprises:
iteratively changing the antenna array configuration according to a predetermined pattern; and
for each iterative change, evaluating the MIMO operating parameter for the antenna array.

8. The method of claim 1 further comprising receiving an antenna configuration report from a remote reporting node, wherein reconfiguring one or more of the reconfigurable antennas comprises reconfiguring one or more of the reconfigurable antennas based on the received antenna configuration report.

9. The method of claim 1 further comprising receiving dominant signal path information from the remote communication node, and identifying the dominant signal path between the MIMO communication node and the remote communication node based on the received dominant signal path information.

10. The method of claim 1 further comprising identifying the dominant signal path between the MIMO communication node and the remote communication node at the MIMO communication node.

11. The method of claim 1 further comprising receiving a multiplicative noise evaluation at the MIMO communication node from a remote reporting node, wherein determining that multiplicative noise limits the throughput conditions comprises determining that multiplicative noise limits the throughput conditions based on the received multiplicative noise evaluation.

12. The method of claim 1 wherein determining that multiplicative noise limits the throughput conditions comprises:
evaluating at least one of a MIMO operating parameter and a signal quality parameter associated with signals communicated between the MIMO communication node and the remote communication node; and
determining that multiplicative noise limits the throughput conditions based on at least one of the MIMO operating parameter and the signal quality parameter.

13. The method of claim 1 wherein determining that multiplicative noise limits the throughput conditions comprises determining that multiplicative noise limits the throughput conditions based on past multiplicative noise observations associated with at least one of the MIMO communication node and a cell in the wireless communication network.

14. A multiple-input, multiple-output (MIMO) communication node in a wireless communication network and configured to communicate with a remote communication node in the wireless network, the MIMO communication node comprising:
an antenna array having a plurality of reconfigurable antennas;
a noise processor operatively connected to the antenna array and configured to determine that multiplicative noise limits throughput conditions for the MIMO communication node, said multiplicative noise comprising any noise dependent on or proportional to a signal strength of at least one of the MIMO communication node and the remote communication node; and
an antenna configuration circuit operatively connected to the antenna array and the noise processor, the antenna configuration circuit configured to reconfigure one or more of the reconfigurable antennas to redirect a radiation pattern of each of the reconfigured antennas to reduce a gain of the reconfigured antennas for a dominant signal path between the MIMO communication node and the remote communication node.

15. The MIMO communication node of claim 14 wherein the dominant signal path comprises a line of sight signal path between the MIMO communication node and the remote communication node.

16. The MIMO communication node of claim 14 wherein the antenna array comprises a phase shifter circuit for one or more antenna elements of each antenna, and wherein the antenna configuration circuit reconfigures one or more of the reconfigurable antennas by controlling a phase shift of one or more of the phase shifter circuits to redirect the radiation pattern of the reconfigured antennas to reduce the gain of the reconfigured antennas for the dominant signal path.

17. The MIMO communication node of claim 14 wherein the antenna configuration circuit is further configured to configure a first antenna of the antenna array to increase a gain of the first antenna for the dominant signal path, wherein the antenna configuration circuit reconfigures one or more of the reconfigurable antennas by reconfiguring one or more of the remaining antennas to redirect the radiation pattern of each of the reconfigured antennas to reduce the gain of the reconfigured antennas for the dominant signal path between the MIMO communication node and the remote communication node.

18. The MIMO communication node of claim 14 wherein the antenna configuration circuit reconfigures one or more of the reconfigurable antennas by reconfiguring all of the reconfigurable antennas of the antenna array to redirect the radiation pattern of each of the reconfigured antennas to reduce the gain of the reconfigured antennas for the dominant signal path between the MIMO communication node and the remote communication node.

19. The MIMO communication node of claim 14 wherein the antenna configuration circuit reconfigures one or more of the reconfigurable antennas by:
evaluating different antenna array configurations based on a corresponding MIMO operating parameter;
selecting the antenna array configuration providing the best MIMO operating parameter; and
reconfiguring one or more of the reconfigurable antennas according to the selected antenna configuration.

20. The MIMO communication node of claim 19 wherein the antenna configuration circuit evaluates the different antenna array configurations based on the corresponding MIMO operating parameter by:

iteratively changing the antenna array configuration according to a predetermined pattern; and for each iterative change, evaluating the MIMO operating parameter for the antenna array.

21. The MIMO communication node of claim 14 further comprising a receiver operatively connected to the antenna configuration circuit and configured to receive an antenna configuration report from a remote reporting node, wherein the antenna configuration circuit reconfigures one or more of the reconfigurable antennas based on the received antenna configuration report.

22. The MIMO communication node of claim 14 further comprising a path circuit operatively connected to the antenna configuration circuit and configured to identify the dominant signal path between the MIMO communication node and the remote communication node based on dominant signal path information received from the remote communication node.

23. The MIMO communication node of claim 14 further comprising a path circuit operatively connected to the antenna configuration circuit and configured to identify the dominant signal path between the MIMO communication node and the remote communication node.

24. The MIMO communication node of claim 14 further comprising a receiver operatively connected to the noise processor and configured to receive a multiplicative noise evaluation from a remote reporting node, wherein the noise processor determines that multiplicative noise limits the throughput conditions based on the received multiplicative noise evaluation.

25. The MIMO communication node of claim 14 wherein the noise processor determines at least one of a quantitative estimate and a qualitative evaluation of the multiplicative noise to determine that multiplicative noise limits the throughput conditions.

26. The MIMO communication node of claim 14 wherein the noise processor comprises:
   a parameter circuit configured to evaluate at least one of a MIMO operating parameter and a signal quality parameter associated with signals communicated between the MIMO communication node and the remote communication node; and
   a characterization circuit operatively connected to the parameter circuit and configured to determine that multiplicative noise limits the throughput conditions based on at least one of the MIMO operating parameter and the signal quality parameter.

27. The MIMO communication node of claim 26 wherein the noise processor further comprises a memory operatively connected to the characterization circuit and configured to store past multiplicative noise observations associated with at least one of the MIMO communication node and a cell in the wireless communication network, wherein the characterization circuit determines that multiplicative noise limits the throughput conditions based on the past multiplicative noise observations.

28. The MIMO communication node of claim 14 wherein the MIMO communication node comprises one of a transmitting MIMO communication node and a receiving MIMO communication node, and the remote communication node comprises the other of the transmitting MIMO communication node and the receiving MIMO communication node.

29. The MIMO communication node of claim 14 wherein the MIMO communication node comprises one of a pico site, a radio base station, an access point, a relay, a wireless backhaul node, and a user equipment.

30. A method of characterizing multiple-input, multiple-output (MIMO) throughput conditions relative to multiplicative noise in a MIMO wireless communication system, the method comprising:
   evaluating throughput conditions between a transmitting MIMO node and a receiving MIMO node based on at least one of a signal quality parameter and a MIMO utilization parameter; and
   generating a multiplicative noise evaluation characterizing the MIMO throughput conditions relative to multiplicative noise based on the evaluated throughput conditions, said multiplicative noise comprising any noise dependent on or proportional to a signal strength of at least one of the transmitting MIMO node and the receiving MIMO node.

31. The method of claim 30 wherein evaluating the throughput conditions comprises evaluating the throughput conditions based on a comparison between the signal quality parameter and a predetermined multiplicative noise parameter, and wherein generating the multiplicative noise evaluation comprises generating the multiplicative noise evaluation characterizing the throughput conditions as multiplicative noise limited when the comparison satisfies a comparison condition.

32. The method of claim 30 wherein evaluating the throughput conditions comprises determining a difference between the signal quality parameter and a predetermined multiplicative noise parameter, and wherein generating the multiplicative noise evaluation comprises generating the multiplicative noise evaluation characterizing the throughput conditions as multiplicative noise limited when the determined difference is satisfies a threshold condition.

33. The method of claim 30 further comprising:
   determining a first MIMO utilization parameter for a first power level; and
   determining a second MIMO utilization parameter for a second power level less than the first power level;
   wherein evaluating the throughput conditions comprises evaluating the throughput conditions based on a comparison between the first and second MIMO utilization parameters; and
   wherein generating the multiplicative noise evaluation comprises generating the multiplicative noise evaluation characterizing the throughput conditions as multiplicative noise limited when the comparison satisfies a comparison condition.

34. The method of claim 33 further comprising directly controlling the first and second power levels.

35. The method of claim 30 wherein evaluating the throughput conditions comprises evaluating the throughput conditions based on the signal quality parameter and the MIMO utilization parameter.

36. The method of claim 35 wherein evaluating the throughput conditions based on the signal quality parameter and the MIMO utilization parameter comprises:
   comparing the signal quality parameter to a first multiplicative noise threshold; and
   comparing the MIMO utilization parameter to a second multiplicative noise threshold;
   wherein generating the multiplicative noise evaluation comprises generating the multiplicative noise evaluation characterizing the throughput conditions as multiplicative noise limited when the signal quality parameter satisfies the first multiplicative noise threshold condition and the MIMO utilization parameter satisfies the second multiplicative noise threshold condition.

37. The method of claim 30 further comprising determining the signal quality parameter by determining a signal-to-interference ratio based on a signal power level and an interference power level.

38. The method of claim 30 further comprising determining the signal quality parameter by determining a signal-to-interference plus noise ratio based on a signal power level, an additive noise level, and an interference power level.

39. The method of claim 30 wherein the MIMO utilization parameter comprises at least one of a throughput parameter, a channel quality indicator, and a rank indicator.

40. The method of claim 30 further comprising storing multiple multiplicative noise evaluations for at least one of a geographic location, a network cell, and a mobile device, wherein generating the multiplicative noise evaluation comprises generating the multiplicative noise evaluation characterizing the throughput conditions as multiplicative noise limited based on the stored multiplicative noise evaluations.

41. The method of claim 30 further comprising reporting the multiplicative noise evaluation to a remote node.

42. The method of claim 30 wherein the multiplicative noise evaluation comprises at least one of a quantitative estimate and a qualitative evaluation of the multiplicative noise.

43. The method of claim 30 further comprising identifying a dominant signal path between the transmitting MIMO node and the receiving MIMO node.

44. The method of claim 43 further comprising reporting the identified dominant signal path to a remote node.

45. A noise processor configured to characterize multiple-input, multiple-output (MIMO) throughput conditions relative to multiplicative noise in a MIMO wireless communication system, the noise processor comprising:
a parameter circuit configured to evaluate throughput conditions between a transmitting MIMO node and a receiving MIMO node based on at least one of a signal quality parameter and a MIMO utilization parameter; and
a characterization circuit operatively connected to the parameter circuit and configured to generate a multiplicative noise evaluation characterizing the MIMO throughput conditions relative to multiplicative noise based on the evaluated throughput conditions, said multiplicative noise comprising any noise dependent on or proportional to a signal strength of at least one of the transmitting MIMO node and the receiving MIMO node.

46. The noise processor of claim 45 wherein the parameter circuit comprises a signal quality circuit configured to evaluate the throughput conditions based on a comparison between the signal quality parameter and a predetermined multiplicative noise parameter, and wherein the characterization circuit is configured to generate the multiplicative noise evaluation characterizing the throughput conditions as multiplicative noise limited when the comparison satisfies a comparison condition.

47. The noise processor of claim 45 wherein the parameter circuit comprises a signal quality circuit configured to evaluate the throughput conditions by determining a difference between the signal quality parameter and a predetermined multiplicative noise parameter, and wherein the characterization circuit is configured to generate the multiplicative noise evaluation characterizing the throughput conditions as multiplicative noise limited when the determined difference satisfies a threshold condition.

48. The noise processor of claim 45 wherein:
the parameter circuit comprises a MIMO utilization circuit configured to:
determine a first MIMO utilization parameter for a first power level; and
determine a second MIMO utilization parameter for a second power level less than the first power level; and
the parameter circuit is configured to evaluate the throughput conditions by evaluating the throughput conditions based on a comparison between the first and second MIMO utilization parameters; and
the characterization circuit is configured to generate the multiplicative noise evaluation characterizing the throughput conditions as multiplicative noise limited when the first MIMO utilization parameter is less than or equal to the second MIMO utilization parameter.

49. The noise processor of claim 48 wherein the noise processor is further configured to directly control the first and second power levels.

50. The noise processor of claim 45 wherein the parameter circuit is configured to evaluate the throughput conditions based on the signal quality parameter and the MIMO utilization parameter.

51. The noise processor of claim 50 wherein:
a parameter circuit comprises;
a signal quality circuit configured to compare the signal quality parameter to a first multiplicative noise threshold; and
a MIMO utilization circuit configured to compare the MIMO utilization parameter to a second multiplicative noise threshold; and
the characterization circuit is configured to generate the multiplicative noise evaluation characterizing the throughput conditions as multiplicative noise limited when the signal quality parameter satisfies the first multiplicative noise threshold condition and the MIMO utilization parameter satisfies the second multiplicative noise threshold condition.

52. The noise processor of claim 45 wherein the parameter circuit comprises a signal quality circuit configured to determine the signal quality parameter by determining a signal-to-interference ratio based on a signal power level and an interference power level.

53. The noise processor of claim 45 wherein the parameter circuit comprises a signal quality circuit configured to determine the signal quality parameter by determining a signal-to-interference plus noise ratio based on a signal power level, an additive noise level, and an interference power level.

54. The noise processor of claim 45 wherein the MIMO utilization parameter comprises at least one of a throughput parameter, a channel quality indicator, and a rank indicator.

55. The noise processor of claim 45 further comprising a memory operatively connected to the characterization circuit, the memory configured to store multiple multiplicative noise evaluations for at least one of a geographic location, a network cell, and a mobile device, wherein the characterization circuit is configured to generate the multiplicative noise evaluation characterizing the throughput conditions as multiplicative noise limited based on the stored multiplicative noise evaluations.

56. The noise processor of claim 45 wherein the multiplicative noise evaluation comprises at least one of a quantitative estimate and a qualitative evaluation of the multiplicative noise.

57. The noise processor of claim 45 wherein the noise processor is further configured to report the multiplicative noise evaluation to a remote MIMO node.

58. The noise processor of claim 45 further comprising a path circuit configured to identify a dominant signal path between the transmitting MIMO node and the receiving MIMO node.

59. The noise processor of claim 58 wherein the path circuit is further configured to report the identified dominant signal path to a remote MIMO node.

* * * * *